US008755352B2

United States Patent
Rommer et al.

(10) Patent No.: US 8,755,352 B2
(45) Date of Patent: Jun. 17, 2014

(54) METHOD AND APPARATUS FOR DEFERRED LEG LINKING IN PCRF IN RELATION TO HANDOVER

(75) Inventors: Stefan Rommer, Vastra Frolunda (SE); Susana Fernadez Alonso, Madrid (ES); Lars Gunnar Lovsen, Gothenburg (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 226 days.

(21) Appl. No.: 13/257,690

(22) PCT Filed: Mar. 5, 2010

(86) PCT No.: PCT/EP2010/052808
§ 371 (c)(1),
(2), (4) Date: Sep. 20, 2011

(87) PCT Pub. No.: WO2010/108770
PCT Pub. Date: Sep. 30, 2010

(65) Prior Publication Data
US 2012/0026979 A1 Feb. 2, 2012

Related U.S. Application Data

(60) Provisional application No. 61/162,419, filed on Mar. 23, 2009.

(51) Int. Cl.
*H04W 4/00* (2009.01)
(52) U.S. Cl.
USPC .......................................................... 370/331
(58) Field of Classification Search
USPC ................................................. 370/330–335
See application file for complete search history.

(56) References Cited

U.S. PATENT DOCUMENTS

| | | | |
|---|---|---|---|
| 2007/0213031 A1* | 9/2007 | Ejzak et al. | 455/406 |
| 2009/0092093 A1* | 4/2009 | Wu et al. | 370/331 |
| 2009/0109922 A1* | 4/2009 | Livanos | 370/331 |
| 2009/0129342 A1* | 5/2009 | Hwang et al. | 370/331 |
| 2010/0035578 A1* | 2/2010 | Ahmed | 455/411 |
| 2011/0022722 A1* | 1/2011 | Castellanos et al. | 709/235 |
| 2011/0065435 A1* | 3/2011 | Pancorbo et al. | 455/436 |
| 2011/0151826 A1* | 6/2011 | Miller et al. | 455/404.1 |

(Continued)

OTHER PUBLICATIONS

Clarfications to Gxx / Gx Leg binding 3GPP TSG-SA WG2 S2-086029 Meeting #67 Aug. 25-29 2008.*

(Continued)

*Primary Examiner* — Asad Nawaz
*Assistant Examiner* — Syed S Ali
(74) *Attorney, Agent, or Firm* — Rothwell, Figg, Ernst & Manbeck, P.C.

(57) ABSTRACT

The present invention relates to a solution for handling deferred leg linking in policy and charging rules function in a telecommunications network in relation to handover between two different access technologies. The solution is provided as a nodes, system and a method for handling handover of a user equipment, i.e. UE, (101) in a telecommunications network (100) from one access technology to another access technology, comprising the steps of detecting (203) in a target access gateway, i.e. AGW, (102) that a handover state of the UE is unknown, sending (204) from the target access gateway a gateway control session, i.e. GCS, establishment message to a policy and charging rules function node (105), wherein the message comprise an indication that leg linking of a session is to be deferred until reception of corresponding control signalling from a packet data network gateway (104).

15 Claims, 5 Drawing Sheets

(56) References Cited

U.S. PATENT DOCUMENTS

| | | | |
|---|---|---|---|
| 2011/0201303 A1* | 8/2011 | Cutler et al. | 455/406 |
| 2012/0093167 A1* | 4/2012 | Velandy et al. | 370/401 |
| 2012/0117251 A1* | 5/2012 | Zhou et al. | 709/227 |
| 2012/0124220 A1* | 5/2012 | Zhou et al. | 709/227 |
| 2012/0202457 A1* | 8/2012 | Yang et al. | 455/406 |

OTHER PUBLICATIONS

Ericsson; "Change Request, 23.203 CR 0205, rev 1, Current version 8.2.0", 3GPP TSG-SA WG2 Meeting #67, S2-086029, Aug. 25-29, 2008, 10 pages, XP050330805.

3GPP, "3rd Generation Partnership Project; Technical Specification Group Core Network and Terminals; Policy and Charging Control over Gx reference point (Release 8)" 3GPP TS 29.212, V8.3.0, Mar. 1, 2009, 80 pages, XP050372351.

3GPP, "3rd Generation Partnership Project; Technical Specification Group Services and System Aspects; Policy and charging control architecture (Release 9)", 3GPP TS 23.203 V9.0.0, Mar. 1, 2009, 56 pages, XP050363030.

Huawei, "Clarifications to Gxx/Gx leg linking for the UE without a UE ID to perform the Emergency calls over EPS", 3GPP TSG SA WG2 Meeting #69, TD S2-087772, Nov. 17-21, 2008, 5 pages, XP050332190.

Office Action from European Patent Office for Application No. EP 10 707 894.1, dated Jul. 18, 2013, 2 pages.

* cited by examiner

METHOD AND APPARATUS FOR DEFERRED LEG LINKING IN PCRF IN RELATION TO HANDOVER

CROSS-REFERENCE TO RELATED APPLICATION

This application is a 35 U.S.C. §371 National Phase Entry Application from International Application No. PCT/EP2010/052808, filed Mar. 5, 2010, designating the United States, which claims priority to U.S. Provisional Application No.: 61/162,419, filed Mar. 23, 2009, the disclosures of which are incorporated by reference herein in their entirety.

TECHNICAL FIELD

The present invention relates to a solution for handling deferred leg linking in policy and charging rules function in a telecommunications network in relation to handover between two different access technologies.

BACKGROUND

The 3GPP Evolved Packet System (EPS) architecture is defined in 3GPP TS 23.401 and 3GPP TS 23.402. The Policy and Charging Control (PCC) architecture is defined in 3GPP TS 23.203. There are multiple network architecture scenarios depending on what type of accesses are involved, protocol options, roaming or non-roaming use cases, etc. These architecture scenarios are described in TS 23.401, 23.402 and 23.203. FIG. 5 shows an architecture diagram of a non-roaming scenario including accesses in the 3GPP family of accesses (e.g. E-UTRAN) and non-3GPP access, e.g. WLAN. Additional architecture options may be found in TS 23.401 and 23.402.

There are two architecture options for Policy and Charging Control (FCC); the "on-path" and the "off-path" architecture alternatives. The "on-path" alternative is used when the mobility protocol also supports QoS and bearer signaling. This is the case when GTP is used. The "off-path" alternative is when the mobility protocol does not support QoS and bearer signaling. This applies to Proxy Mobile IP-PMIP and host based Mobile IP (MIP). With "on-path" PCC there is only one policy enforcement entity, policy and charging enforcement function (PCEF). The PCEF is located in the PDN GW.

With "off-path" PCC, there are however two policy enforcement entities, the policy and charging enforcement function (PCEF) and a Bearer Binding and Event Reporting Function (BBERF). The BBERF is located in the Serving GW as well as in a network node in the trusted non-3GPP IP Access (The network node in trusted non-3GPP IP Access as an Access GW in the figure above). From now on, we refer to this network entity where BBERF is located using the generic term Access GW, or AGW. For each IP-CAN session, the PCRF has interfaces both to the PCEF (Gx interface) and BBERF (Gxa/Gxc interface). From now on, the Gxa/Gxc interfaces are commonly referred to as Gxx.

Based on information received in the messages on Gxx and Gx, the PCRF performs a so called "leg linking" to determine which Gxx and Gx sessions belong together for the same IP-CAN session. The sessions over Gxx are also referred to as Gateway Control Sessions (GCS).

When a certain event takes place in the EPS, for example an initial attach or a handover, the GCS is always created before the corresponding event is reported on Gx. For example, at initial attach the GCS is created before the Gx session is created. At handover of an existing connection to a new access, the GCS in the new access is created before the handover is reported on Gx. The PCRF can thus assume that the GCS is supposed to exist at the time when the Gx session is created or modified. Having this temporal order, GCS related signaling occur before corresponding Gx related signaling, simplifies the logic in the PCRF and thus eases the implementation efforts.

When PMIP is used in the network, the Proxy Binding Update (PBU) in most cases contains information (Handoff Indicator, or HI) to the PDN GW whether the PBU corresponds to a new attachment, i.e. creation of a new IP-CAN session or a handover of an existing IP-CAN session. When HI indicates a new attachment, the PDN GW creates a new PDN connection for the relevant user equipment (UE) and also a new IP-CAN session with the PCRF. A new IP address is allocated to the UE. When the HI indicates handover, the PDN GW instead "re-uses" the existing PDN connection and IP-CAN session, assigns the same IP address to the UE in the new access and sends an IP-CAN session modification to the PCRF to report the handover.

In case of handover from a 3GPP access technology to a non-3GPP access technology, there is however a special case where the state, initial attach or handover, is unknown and this is indicated in the PBU by setting the HI to "unknown". This happens for example with UEs that have multiple network interfaces but cannot support IP level session continuity between those accesses. In this case, the PMIP RFC [RFC 5213] and 3GPP TS 23.402 allows for two alternative options:

1. The PDN GW can create a new PDN connection/IP-CAN session and assign a new IP address to the UE in the new access, or
2. Start a timer.
   a. If the UE releases its IP address in the old access before the timer expires, the PDN GW can assume that it is a handover and in this case the PDN GW "re-uses" the PDN connection/IP-CAN session and assigns the same IP address to the UE in the new access.
   b. If the UE has not released its IP address in old access when the timer expires, the PDN GW creates a new PDN connection/IP-CAN session and assigns a new IP address to the UE in the new access.

In case 2a, the current PCC procedures work fine. The GCS in the new access is created first and the PCRF can link the new GCS with the existing Gx/IP-CAN session. The problem occurs in case 1 and 2b. In this case the PCRF, upon creating of the new GCS, will link it to the existing Gx/IP-CAN session without knowing that a new IP-CAN session will be created later. The PCRF will thus link the new GCS to the wrong Gx/IP-CAN session.

SUMMARY

It is therefore an object of the present invention to address these problems.

The present invention provides a solution through that a Bearer binding and event reporting function (BBERF) includes a new indication in a Gateway Control session (GCS) establishment message sent to a Policy and charging rules function (PCRF), to instruct the PCRF to defer the leg linking until the corresponding event is indicated over Gx interface. The message sent over Gx interface may either be an Internet Protocol Connectivity Access Network (IP-CAN) session modification informing the PCRF about the handover (case 2a above in the introduction) or an IP-CAN session establishment (cases 1 and 2b above in the introduction). The IP-CAN type reported over Gx interface may be the same as the IP-CAN type reported in the GCS establishment.

This is provided in a number of aspects, in which as first is a method for handling handover of a user equipment (UE) in a telecommunications network from one access technology to another access technology. The method comprises steps of detecting in a target access gateway (AGW) that a handover state of the UE is unknown, sending from the target access gateway a gateway control session (GCS) establishment message to a policy and charging rules function node. Wherein the message comprise an indication that leg linking of a session is to be deferred until reception of corresponding control signalling from a packet data network gateway (PDN-GW). The establishment message may be an Internet Protocol Connectivity Access Network (IP-CAN) establishment message. The gateway control session may be initiated by a bearer binding and event reporting function. The gateway control session signalling may be executed over a Gxx interface and the corresponding control signalling may be executed over a Gx interface.

The method may further comprise a step of sending a proxy binding update (PBU) comprising an handover indicator set to unknown to the packet data network gateway.

The step of detecting handover state may be determined from an attach message from the UE.

The method may further comprise steps of detecting in the GCS establishment message the leg linking indicator, deferring leg linking of session, obtaining the control signal of session establishment from the PDN-GW, and linking GCS to a new session. The new session may be an Internet Protocol Connectivity Access Network, i.e. IP-CAN, session and wherein IP-CAN session messages may be initiated by a policy and charging enforcement function node.

Another aspect of the present invention is provided, an access gateway node in a telecommunications network. The access gateway node may be configured to detect that a handover state of a user equipment (UE) is unknown, send a gateway control session (GCS) establishment message to a policy and charging rules function node, and wherein the message may comprise an indication that leg linking of a session is to be deferred until reception of corresponding control signalling.

Yet another aspect of the present invention is provided, a policy and charging rules function node (PCRF) in a telecommunications network. The PCRF may be configured to receive a gateway control session (GCS) establishment message for a user equipment (UE) from an access gateway node and wherein the message may comprise an indication that leg linking of an existing session is to be deferred until reception of corresponding control signalling, deferring leg linking of existing session, obtaining a control signal from a packet data network gateway (PDN-GW) of a session establishment for the UE, and linking GCS to a new or existing session.

Furthermore, a system in a telecommunications network is provided. The system comprising an access gateway node and a policy and charging rules function node as indicated.

The main advantage of the invention is that the temporal order between Gxx signaling and Gx signaling may be maintained, also in the case where the handover state is unknown. This simplifies the internal logic in the PCRF and thus reduces implementation costs. It also enables a more stable solution with fewer alternative sequences of events.

Another advantage is in the case of limited PCC deployment (i.e. in case the non-3GPP access does not implement a Gxx/BBERF). If the temporal order between Gxx and Gx signaling is not consistent, the PCRF would need to wait for a certain time period after receiving a Gx message to determine whether a GCS is established or not. Otherwise the PCRF may incorrectly assume that Gxx/BBERF is not deployed upon reception of the Gx message. If so, the PCRF may provide PCC rules only for charging purposes even in case the Gxx session is later established.

BRIEF DESCRIPTION OF THE DRAWINGS

In the following the invention will be described in a non-limiting way and in more detail with reference to exemplary embodiments illustrated in the enclosed drawings, in which.

DETAILED DESCRIPTION

Figure 1:
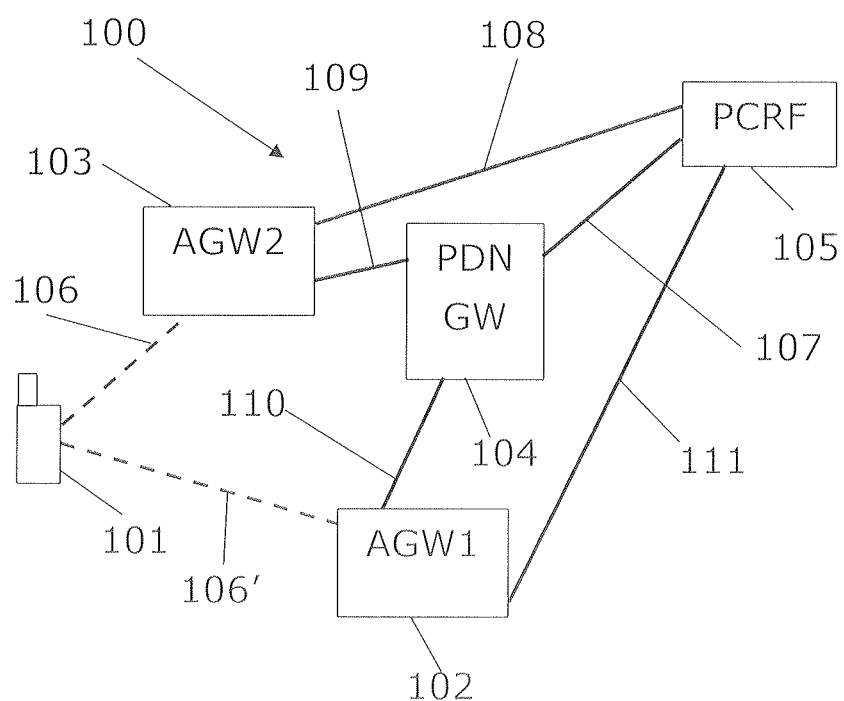
FIG. 1 illustrates schematically a network according to the present invention.

In FIG. 1 reference numeral 100 generally indicate an infrastructure telecommunications network according to the present invention. The network comprise a packet data network gateway 104 (PDN GW), a policy and charging rules function node 105 (PCRF). The gateway 104 is connected to two access gateways: AGW1 102 and AGW2 103. The access gateways connect user equipment 101 to the network using suitable wireless communication technologies 106 and 106'. The two access gateways use different radio access technologies from each other and thus connect differently to the network. In the 10 example shown in FIG. 1 AGW1 is connected to the PDN GW via an interface 110 and the AGW2 is also connected to the PDN GW via an interface 109, examples of interfaces will be discussed in more detail in relation to FIG. 5. Furthermore, the access gateways 102 and 103 are also connected to the PCRF 105 using a Gxx interface 108 and 111; Gxx interface is defined as a Gxa or Gxc interface. The PDN GW 104 is connected to the PCRF using a Gx interface 107. In each AGW is located a bearer binding and event reporting function (BBERF).

As discussed in the introduction, there is in the current solutions a problem during handover with the temporal order between messages to the PCRF using the Gx and Gxx interfaces.

There are 3 different options to solve the problem:
A. Modify the order of GCS establishment and corresponding Gx signaling. This option is feasible but it destroys the simple temporal order between Gxx and Gx signaling that is currently possible.
B. Include a new indication in the IP-CAN session establishment over Gx in cases 1 and 2b as shown in the introduction part of this document. The indication would inform PCRF that it should re-evaluate its leg linking and link the newly establish GCS to this IP-CAN session instead of the old IP-CAN session.
C. Include a new indication in the GCS establishment to inform the PCRF that it should defer leg linking until it has received the corresponding Gx signaling. The PCRF should thus not do any leg linking when receiving the GCS establishment message with this indication but instead wait until the PCRF receives a corresponding message over Gx. In this way the temporal order between the Gxx and Gx signaling is maintained.

Figure 2:
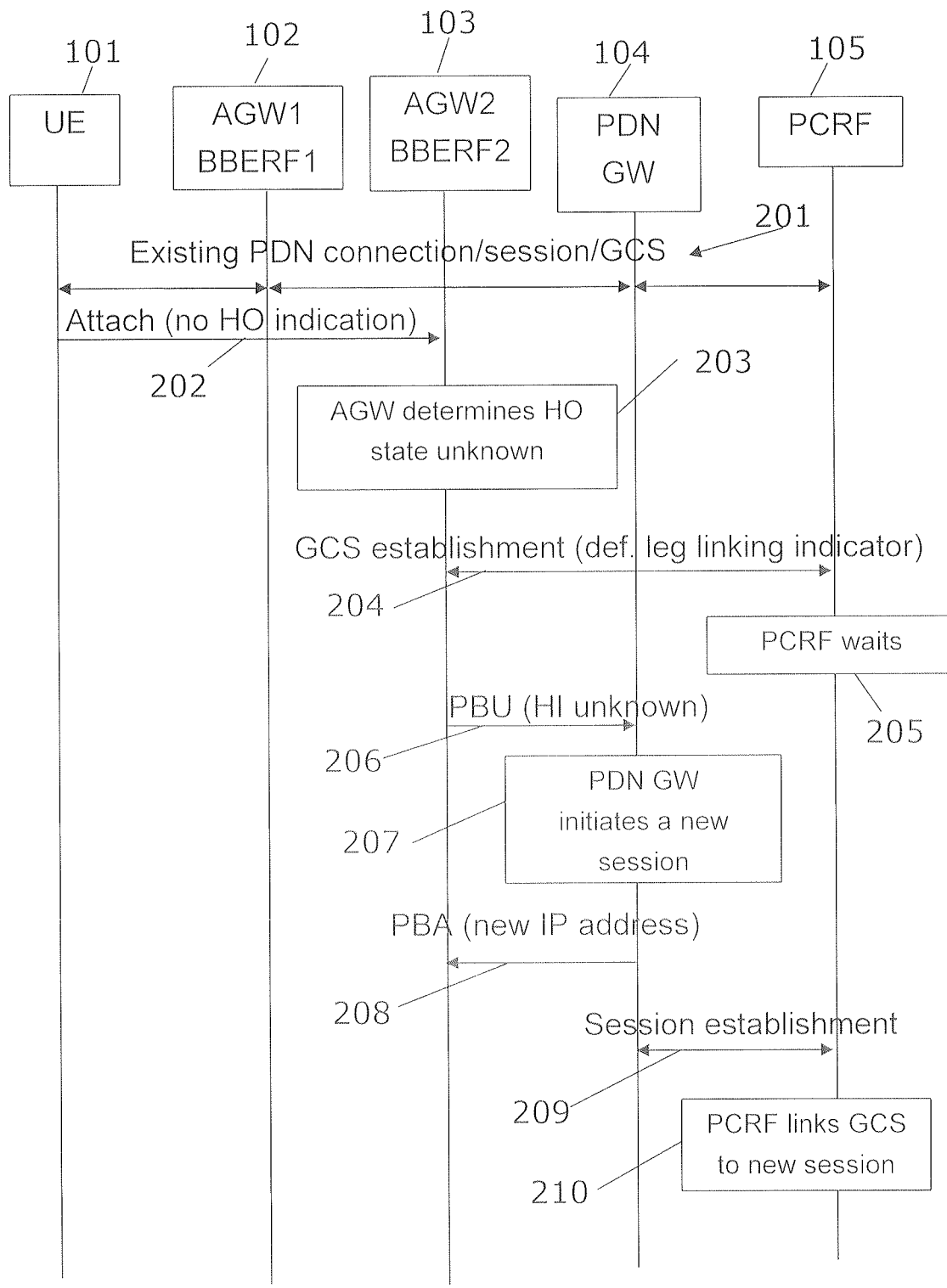
FIG. 2 illustrates schematically in a sequence diagram interaction between network nodes according to the present invention.

Below a solution according to option C above will be exemplified. FIG. 2 illustrates signaling order between the nodes in the network during handover. The signaling is executed between UE 101, AGW1 with BBERF1 102, AGW2 with BBERF2 103, PDN GW 104, and PCRF 105.

201. The UE has an existing PDN connection via one access technology (represented by Access GW 1 in the flow chart). There are corresponding Gateway Control Session (GCS) and IP-CAN session with the PCRF.
202. The UE attaches to another access technology (represented by Access GW 2 in the flow chart). The UE provides no indication about supported mobility features.
203. The AGW2 determines that the handover state is unknown.
204. The BBERF (located in AGW2) initiates a Gateway Control Session (GCS) with the PCRF over the Gxx interface. Since the handover state is unknown, the BBERF includes a "deferred leg linking indicator".
205. Based on the "deferred leg linking indicator", the PCRF does not link the new GCS with the existing IP-CAN session but waits a certain time for a corresponding signal over the Gx interface.
206. The AGW2 sends a Proxy binding Update (PBU) to the PDN GW. The PBU message comprises a handover indicator (HI) which is set to unknown.
207. Based on the current situation, the PDN GW needs to decide on either creating a new connection or handling over the old connection. In this example, the PDN GW decides to create a new connection.
208. The PDN GW replies with a Proxy binding acknowledgement (PBA) message to the AGW2. The PBA comprises a new IP address allocated to the UE.
209. The PDN GW initiates an IP-CAN session establishment over Gx. The PDN GW indicates the IP-CAN type of the new access. The IP-CAN session is initiated by a Policy and Charging Enforcement Function (PCEF).
210. The PCRF links the GCS created in step 204 with the Gx session created in step 209 and determines that there is a connection between these two.

Figure 3:
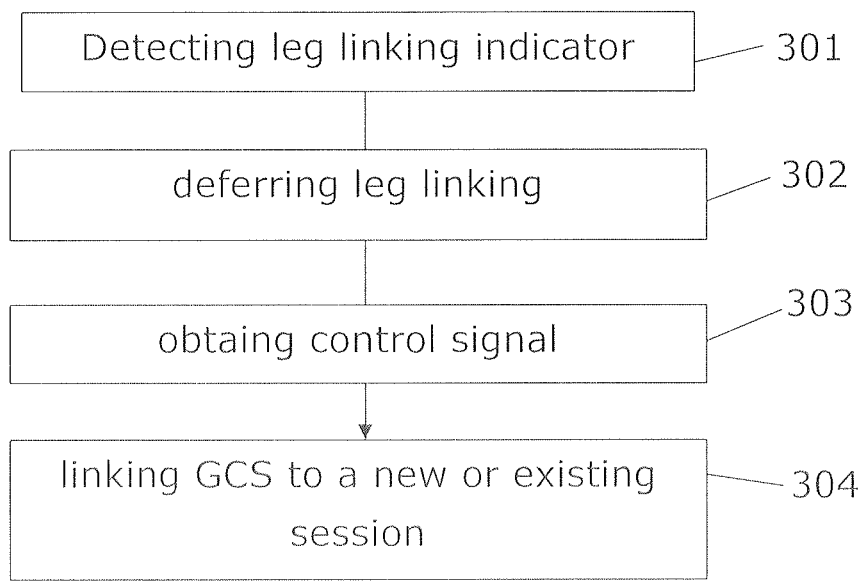
FIG. 3 illustrates schematically in a block diagram a method according to the present invention.

A method according to the present invention may be summarized using FIG. 3. The PCRF may be configured to detect 301 the deferring leg linking indicator. If the leg linking indicator is detected leg linking is deferred 302 for a certain time. This wait state may be interrupted by obtaining 303 a control signal over the Gx interface which makes the PCRF to link 304 the GCS to a new session initiated by the PDN-GW or link to an existing session. Alternatively, the PCRF may terminate GCS created in step 204 when a pre set time limit has expired without obtaining a control signal over the Gx interface. Other alternatives in case of no reception of Gx control signal are also possible, e.g. keeping the GCS active but not linking it to any IP-CAN session. The PCRF may also link the GCS with an existing IP-CAN session, e.g. in case there is only one active IP-CAN session for the UE.

In another embodiment of the present invention the UE has multiple PDN Connections to the same Access point name (APN) and makes a handover between 3GPP access and non-3GPP access. In this case, the UE requests a handover of one PDN Connection for a given APN but cannot tell the network (NW) which PDN Connection out of the connections to the same APN to handover. Instead it is the PDN-GW that decides which PDN Connection out of the existing PDN Connections for that APN that is handed over. In this case, the deferred leg linking preferably is done so that the PCRF links the new Gxx session with the right Gx session.

Figure 4:
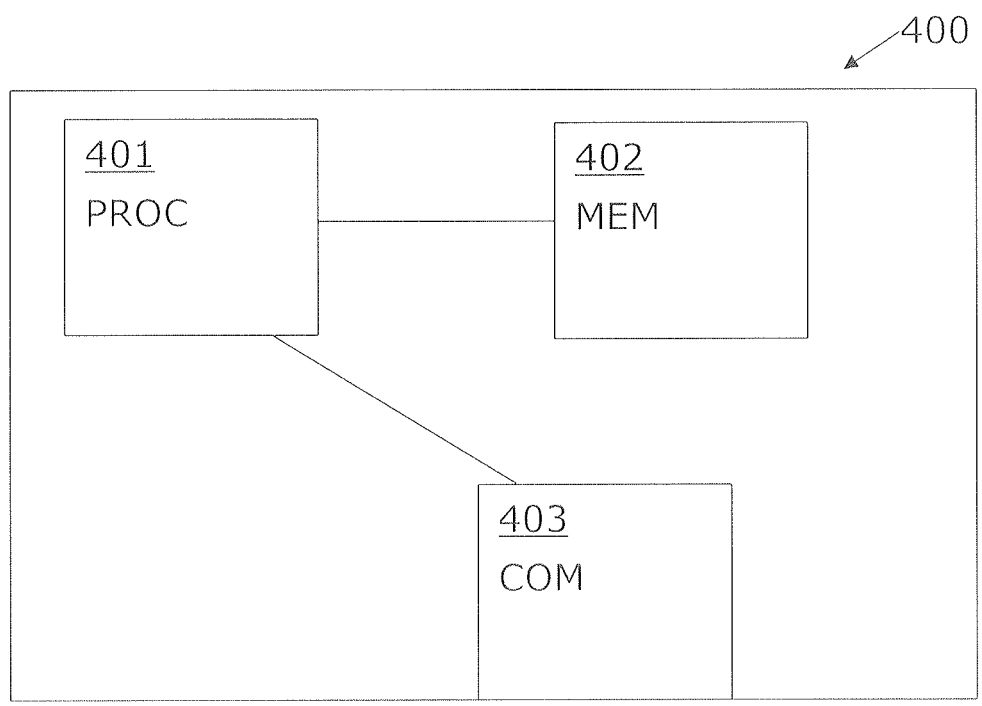
FIG. 4 illustrates schematically in a block diagram a device according to the present invention.

A node comprising the PCRF 400 is illustrated in FIG. 4, comprising at least one processing unit 401, at least one memory unit 402, and at least one communication interface 403. The processing unit may comprise any suitable processing device such as for instance a microprocessor, digital signal processor (DSP), application specific integrated circuit (ASIC), or field programmable gate array (FPGA). The memory unit may be of a volatile and/or non-volatile memory type and comprise software or hardware instruction sets readable by the processing unit and may provide storage of intermediate or permanent storage of data for the processing unit. The processing unit is further configured to obtain and send communication data using the communication interface. The processing unit executes instruction sets stored in the memory, stored in the processing unit itself, or a combination of stored in the processing unit and the memory.

Figure 5:
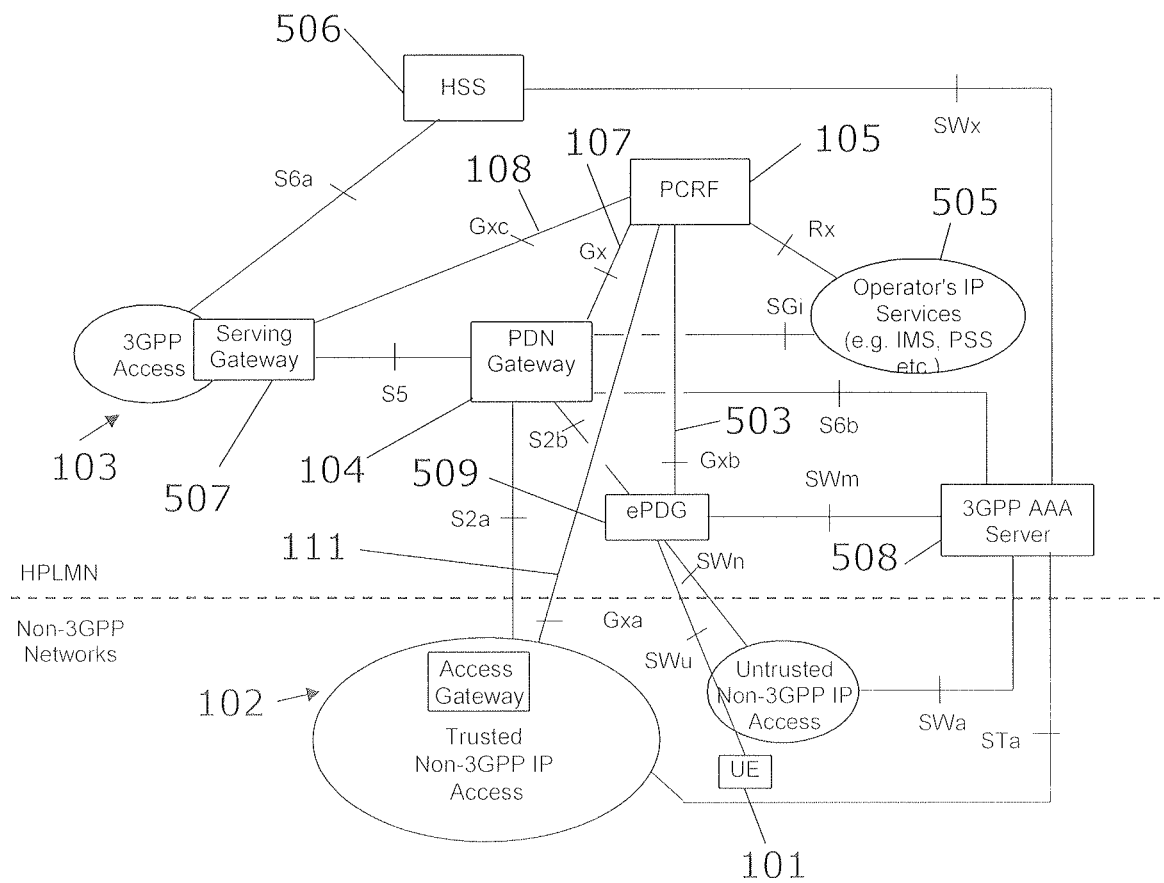
FIG. 5 illustrates schematically in a network according to the present invention.

FIG. 5 illustrates an example network with a non-3GPP network connected to a 3GPP Home Public Land Mobile Network (HPLMN) with nodes interconnectivity and with appropriate interfaces. The UE 101 may attach to a non-3GPP access network 102 or to a 3GPP access network 103. The network further comprises a PDN GW 104, a serving gateway (SGW) 507, a PCRF 105, a Home subscriber server (HSS) 506, and an evolved Packet data gateway (ePDG) 509. The network is also connected to an Operator's Internet Protocol services network 505, e.g. IP multimedia Subsystem (IMS), Packet-switched Streaming Service (PSS), Internet services, and so on. The access gateway of the non-3GPP network is connected to the PCRF using a Gxa interface 111 and the serving gateway part of the 3GPP access network is connected to the PCRF using a Gxc interface 108. Furthermore, the PDN GW is connected to the PCRF using a Gx interface 107. There is also a Gxb interface 503 connecting the ePDG to the PCRF. For accounting, authorization, and authentication (AAA) purposes a 3GPP AAA server 508 is provided connected to the network; however, it should be appreciated that the AAA server 508 may be provided outside the network by a third party or that it may be provided as part of the network. Other interfaces are shown but do not form part of the core of the present invention. In FIG. 5 the UE is indicated as connected to the ePDG but the UE may be connected to the access gateway 102 of the non-3GPP network and thus to the PDN-GW 104. The HSS provide subscriber information of the UE to the network nodes in the network which is used for instance by the AAA server.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be at least in part implemented by means of both hardware and software, and that several "means" or "units" may be represented by the same item of hardware.

The above mentioned and described embodiments are only given as examples and should not be limiting to the present invention. Other solutions, uses, objectives, and functions within the scope of the invention as claimed in the below described patent claims should be apparent for the person skilled in the art.

| ABBREVIATIONS | |
|---|---|
| 3GPP | 3rd Generation Partnership Project |
| AAA | Accounting Authorization and Authentication |
| AGW | Access Gateway |
| APN | Access Point Name |
| BBERF | Bearer Binding and Event Reporting Function |
| ePDG | Evolved Packet Data network Gateway |
| EPS | Evolved Packet System |
| GCS | Gateway Control Session |
| GPRS | General Packet Radio Service |
| GTP | GPRS Tunneling Protocol |
| GW | Gateway |
| HI | Handover/handoff Indicator |
| HO | Handover/Handoff |
| HPLMN | Home Public Land Mobile Network |
| HSS | Home Subscriber Server |
| ICS | IP-CAN Session |
| IMS | IP multimedia Subsystem |
| IP | Internet Protocol |
| IP-CAN | IP-Connectivity Access Network |
| PBA | Proxy binding Acknowledgement |
| PBU | Proxy binding Update |
| PCC | Policy and Charging Control |
| PCEF | Policy and Charging Enforcement Function |
| PCRF | Policy and Charging Rules Function |
| PDN | Packet Data Network |
| PDN-GW | Packet Data Network Gateway |
| PMIP | Proxy Mobile IP |
| PSS | Packet-switched Streaming Service |
| SAE | System Architecture Evolution |
| UE | User Equipment |
| QoS | Quality of Service |

The invention claimed is:

1. A method for handling handover of a user equipment (UE) in a telecommunications network from one access technology to another access technology, comprising:
   detecting, in a target access gateway, that a handover state of the UE is unknown;
   sending, from the target access gateway, a gateway control session (GCS) establishment message to a policy and charging rules function (PCRF) node, wherein the GCS establishment message comprises an indication instructing the PCRF node to defer leg linking of a session until reception of corresponding control signaling from a packet data network gateway (PDN GW), wherein the handover state is associated with handover from a 3GPP access technology to a non-3GPP access technology, wherein the controlling signaling is from the PDN-GW and is communicated over a Gx interface, and wherein the GCS establishment message causes the PCRF node, after the PCRF node receives the GCS establishment message, to (i) defer leg linking of the existing session; (ii) obtain a control signal from the packet data network gateway (PDN GW) of a session establishment for the UE; and (iii) link GCS to a new session.

2. The method according to claim 1, wherein the establishment message is an Internet Protocol Connectivity Access Network (IP-CAN) establishment message.

3. The method according to claim 1, wherein the session is initiated by a bearer binding and event reporting function.

4. The method according to claim 1, wherein the gateway control session (GCS) establishment message is transmitted using a Gxx interface.

5. The method according to claim 1, further comprising sending to the packet data network gateway (PDN GW) a proxy binding update (PBU) comprising a handover indicator set to unknown.

6. The method according to claim 1, wherein the step of detecting that the handover state is unknown is determined from an attach message transmitted from the UE.

7. The method according to claim 1, wherein the corresponding control signaling is an Internet Protocol Connectivity Access Network (IP-CAN) session modification message or an IP-CAN session establishment message, wherein the IP-CAN session modification message provides information about the handover to the PCRF node.

8. The method according to claim 1, wherein the new session is an Internet Protocol Connectivity Access Network (IP-CAN) session.

9. The method according to claim 8, wherein IP-CAN session messages are initiated by a policy and charging enforcement function node.

10. An access gateway node, comprising at least one processing unit configured to:
    detect that a handover state of a user equipment (UE) is unknown; and
    send a gateway control session (GCS) establishment message to a policy and charging rules function (PCRF) node, wherein the GCS establishment message comprises an indication instructing the PCRF node to defer leg linking of a session until reception of corresponding control signaling, wherein the handover state is associated with handover from a 3GPP access technology to a non-3GPP access technology, wherein the controlling signaling is from a PDN-GW and is communicated over a Gx interface, and wherein the GCS establishment message causes the PCRF node, after the PCRF node receives the GCS establishment message, to (i) defer leg linking of the existing session; (ii) obtain a control signal from the packet data network gateway (PDN GW) of a session establishment for the UE; and (iii) link GCS to a new session.

11. The access gateway node of claim 10, wherein the corresponding control signaling is an Internet Protocol Connectivity Access Network (IP-CAN) session modification message or an IP-CAN session establishment message, and wherein the IP-CAN session modification message provides information about handover to the PCRF node.

12. A policy and charging rules function (PCRF) node, comprising at least one processing unit configured to:
    receive a gateway control session (GCS) establishment message for a user equipment (UE) from an access gateway node, wherein the GCS establishment message comprises an indication instructing the PCRF node to defer leg linking of an existing session until reception of corresponding control signaling, and wherein the gateway node sends the GCS establishment message comprising the indication to defer leg linking to the PCRF node in response to detecting that a handover state of the UE is unknown, wherein the handover state is associated with handover from a 3GPP access technology to a non-3GPP access technology, and wherein the controlling signaling is from a PDN-GW and is communicated over a Gx interface;
    defer leg linking of the existing session;
    obtain a control signal from the packet data network gateway (PDN GW) of a session establishment for the UE; and
    link GCS to the existing session or to a new session.

13. The PCRF node of claim 12, wherein the corresponding control signaling is an Internet Protocol Connectivity Access Network (IP-CAN) session modification message or an IP-CAN session establishment message, and wherein the IP- CAN session modification message provides information about handover to the PCRF node.

14. A system in a telecommunications network, comprising:
   an access gateway node configured to: (i) detect that a handover state of a user equipment (UE) is unknown; and (ii) send a gateway control session (GCS) establishment message to a policy and charging rules function (PCRF) node, wherein the GCS establishment message comprises an indication instructing the PCRF node to defer leg linking of a session until reception of corresponding control signaling, wherein the handover state is associated with handover from a 3GPP access technology to a non-3GPP access technology, and wherein the controlling signaling is from a PDN-GW and is communicated over a Gx interface; and
   the PCRF node, which is configured to: (i) receive the gateway control session (GCS) establishment message for the user equipment (UE) from the access gateway node, wherein the GCS establishment message comprises the indication instructing the PCRF node to defer leg linking of an existing session until reception of corresponding control signaling; (ii) defer leg linking of the existing session; (iii) obtain a control signal from the packet data network gateway (PDN GW) of a session establishment for the UE; and (iv) link GCS to a new session.

15. The system of claim 14, wherein the corresponding control signaling is an Internet Protocol Connectivity Access Network (IP-CAN) session modification message or an IP-CAN session establishment message, wherein the IP-CAN session modification message provides information about handover to the PCRF node.

* * * * *

UNITED STATES PATENT AND TRADEMARK OFFICE
CERTIFICATE OF CORRECTION

PATENT NO. : 8,755,352 B2  Page 1 of 1
APPLICATION NO. : 13/257690
DATED : June 17, 2014
INVENTOR(S) : Rommer et al.

It is certified that error appears in the above-identified patent and that said Letters Patent is hereby corrected as shown below:

In the Specification

Column 1, Line 37, delete "(FCC);" and insert -- (PCC); --, therefor.

Column 4, Line 37, delete "the 10 example" and insert -- the example --, therefor.

Column 4, Line 37, delete "FIG. 1 AGW1" and insert -- FIG.1, AGW1 --, therefor.

Column 7, Line 6, delete "AGVV" and insert -- AGW --, therefor.

Signed and Sealed this
Fourteenth Day of October, 2014

Michelle K. Lee
*Deputy Director of the United States Patent and Trademark Office*